Oct. 27, 1959     P. A. MADSEN     2,910,097
LIQUID LEVEL SIGNALING DEVICE
Filed May 9, 1958
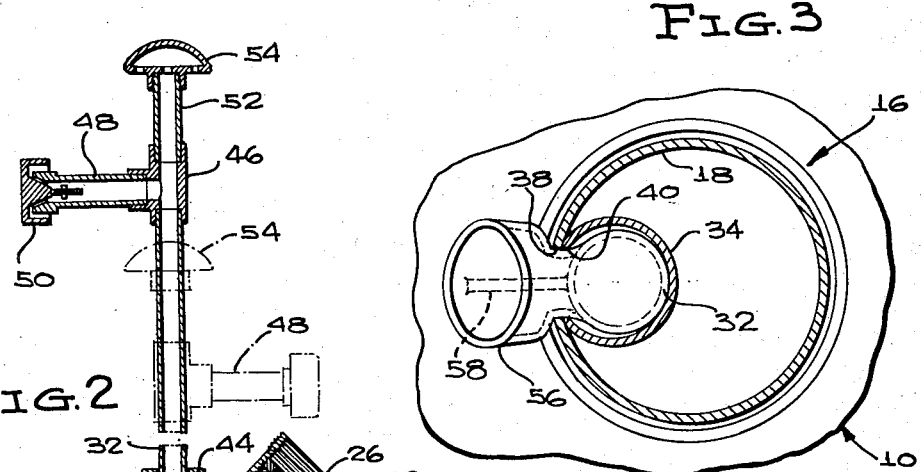
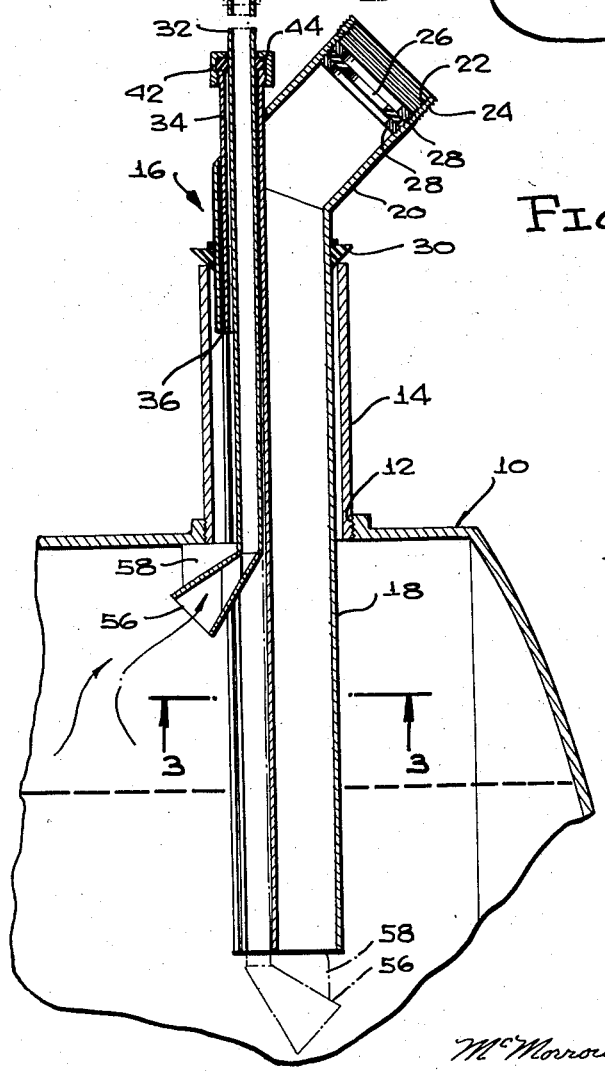
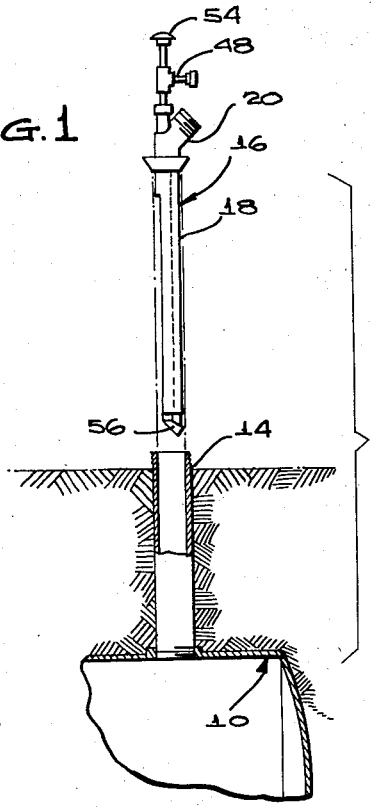
INVENTOR.
PETER A. MADSEN

2,910,097
LIQUID LEVEL SIGNALING DEVICE

Peter A. Madsen, Newtown, Pa.

Application May 9, 1958, Serial No. 734,197

9 Claims. (Cl. 141—96)

The present invention relates to liquid storage tanks generally and in particular to a liquid level signaling device for insertion into the filler opening of such a tank.

An object of the present invention is to provide a liquid level signaling device which lends itself to ready insertion into and withdrawal from a filler opening in a liquid storage tank.

Another object of the present invention is to provide a liquid level signaling device which, when inserted into the filler opening of a storage tank, accurately and automatically signals when a predetermined level of liquid has been received within the tank.

A further object of the present invention is to provide a liquid level signaling device for insertion into a liquid storage tank which is particularly useful with liquid fuel tanks which are normally buried in the ground with only a filler pipe extending above the ground, one which is readily portable and easily stored upon the fuel oil truck tank or trailer, one which is simple in structure and readily fabricated of common materials, and one which is economically feasible.

These and other objects and advantages of the present invention will be fully apparent from the following description when taken in conjunction with the annexed drawing, in which:

Figure 1 is a view partially in section of an upper end portion of a liquid storage tank buried in the ground with its filler pipe extending above the ground surface, the liquid level signaling device being shown in a position prior to insertion through the filler pipe;

Figure 2 is an enlarged view partially in section of the assembly shown in Figure 1 with the device of the present invention installed in operating condition within the tank filler pipe, the dotted line showing indicating the inoperative position of the signaling portion of the device of the present invention; and Figure 3 is a view on an enlarged scale, taken on the line 3—3 of Figure 2.

Referring in greater detail to the drawing in which like numerals indicate like parts throughout the several views, the reference numeral 10 designates a fuel oil storage tank of which only an upper-end portion is shown in Figures 1 and 2. The upper end of the tank 10 is provided with a filler opening 12 normally closed by a filler pipe 14, the upper end of the pipe 14 having conventional means thereon (not shown) closing the same until it is necessary to replenish the liquid within the tank 10.

The liquid level signaling device of the present invention is designated generally by the reference numeral 16 and consists in a main tube 18 having an annularly disposed extension 20 on its upper end. The upper end portion of the extension 20 is provided with internal threads, as at 22, and with external threads, as at 24. Within the upper end portion of the extension 20 is threadedly received a resilient washer 26 having an internal diameter or opening of a size to snugly receive the nozzle on the end of a fuel oil delivery hose conventionally attached to a fuel oil truck tank or trailer tank, neither the nozzle nor the hose or tank being shown as not being a part of the present invention. The washer 26 is secured between a pair of support members 28 threadedly engaged within the open upper end portion of the extension 20.

The main tube 18 is of a size to be loosely inserted into the filler pipe 14 with the portion adjacent the lower end projecting into the tank 10 and the portion adjacent the upper end projecting out of the upper open end of the filler pipe 14, as shown in Figure 2.

Means is provided closing the filler pipe 14 about the main tube 18 when the latter is inserted in the filler pipe 14. Specifically, this means consists in a tapered resilient collar 30 circumposed about the main tube 18 at a point spaced below the junction of the main tube 18 with the extension 20. When the main tube 18 extends through the filler opening 12 and the filler pipe 14, the collar 30 seals the upper end of the filler pipe 14 and prevents the escape of air therefrom.

The liquid level signaling device of the present invention includes an auxiliary open-ended tube 32 arranged longitudinally of and within and adjacent the inner wall of the main tube 18. The auxiliary tube 32 is mounted for rotation within a sleeve 34 which has its lower end contiguous to the lower end of the main tube 18 and has its upper end projecting through an aperture provided in the extension 20.

As shown most clearly in Figure 3, the sleeve 34 and the main tube 18 are slotted for a distance extending from their lower ends to a point spaced below the collar 30, such point being designated by the reference numeral 36 in Figure 2. The slots of the main tube 18 and sleeve 34 are in registry and the walls of the slots are welded together so that in effect the interior of the main tube 18 exteriorly of the sleeve 34 is sealed off of the space within the sleeve 34 and a portion of the sleeve 34 below the point 36 is open to the atmosphere. In Figure 3 the slot in the main tube is designated by the reference numeral 38 and the slot in the sleeve 34 is designated by the reference numeral 40.

The portion of the sleeve 34 adjacent the upper end extends exteriorly of the extension 20 and is provided with a cap 42 threadedly attached thereon, a resilient sealing washer 44 being positioned within the cap 42 and sealing the space between the auxiliary tube and the sleeve 34 at that point.

The auxiliary tube 32 includes a T connector 46 and a nipple 48 projecting perpendicularly from the connector 46. The free end of the nipple 48 carries a hand openable and closable valve 50 for regulating the volume of air escaping through the nipple 48. Upwardly from the connector 46 is another nipple 52 carrying on its upper end a whistle body 54 having therein an air-actuable whistle which provides an audible signal when air passes out of the upper end of the nipple 52 and through the body 54, such whistle being of conventional construction and therefore not described in detail for reasons of simplification.

On the lower end of the auxiliary tube 32 is an air inlet means in communication with the lower end of the auxiliary tube. This inlet means consists in outwardly flared funnel-shaped member 56, fixedly secured to the lower end of the auxiliary tube 32. The funnel-shaped member 56 is slidable within the complementary slots 38 and 40 in the tube 18 and sleeve 34, respectively, from the upper end point 36 of such slots to and out of the lower end of the slots to a position below the lower end of the main tube 18, as shown in dotted lines in Figure 2. The auxiliary tube 32 is also rotatable from the full line position to the dotted line position so that the funnel-shaped member 56 may be positioned in alignment with and below the open end of the main tube 18. The nipple 48 serves adequately as a handle for manually rotating and raising and lowering the auxiliary tube 32 within the sleeve 34. The nipple 48 constitutes means operatively connected to the auxiliary tube 32 for effecting the rotational and up and down movements of the tube 32.

Superimposed upon the funnel-shaped member 56 is an angularly cut plate member 58 having its upper edge horizontal and its lower edge fixedly secured to the upper portion of the member 56 and carried thereby. The plate member 58 constitutes a stop element engageable with the undersurface of the upper end of the tank 10 adjacent the filler opening 12 for indicating when the inlet means or funnel-shaped member 56 has been manually shifted upwardly to a predetermined height within the tank 10. Such height is dictated by the relative length of the plate member 58. In use, the liquid level signaling device of the present invention is easily carried upon the fuel oil truck or trailer and is readily inserted into the filler pipe 14 of a fuel oil tank or container with the funnel-shaped member 56 in the nested condition below the open end of the main tube 18, as shown in Figure 1. After the collar 30 is in sealing engagement with the upper end of the filler pipe 14 or the filler opening 12, the nipple 48 is used as a handle to rotate the tube 32 to the position in which the plate member 58 and the attached funnel-shaped member 56 may enter the lower end of the slots 38 and 40 and the tube 32 shifted upwardly to a point in which the plate member 58 engages the underside of the tank top. Upon introduction into the extension 20 of the nozzle on the end of the fuel delivery hose, the washer 26 seals the extension 20 against the escape of air therefrom and the air within the tank 10 is discharged upwardly through the funnel-shaped member 56 into the auxiliary tube 32 and thence upwardly out of the whistle body 54, causing a signal to be audible indicating, when the fuel level reaches the upper end of the opening into the member 56, the desired predetermined level of liquid has been reached within the tank 10. This will be indicated by the cessation of the signal upon stoppage of the flow of air outwardly of the tank 10. The signal strength may be regulated by permitting more or less air to escape out of the nipple 48 by control of the air volume passing through the valve 50.

What is claimed is:

1. For use with a closed container having a filler opening in the upper end, a liquid level signaling device for insertion into said filler opening, said device comprising a main tube having open upper and lower ends adapted to be loosely inserted into said filler opening with its lower end portion projecting into the container and with its upper end projecting out of said filler opening and adapted to be connected to a source of fluid, means closing said filler opening when said device is inserted in said opening, an auxiliary open-ended tube arranged longitudinally with respect to said main tube and connected to said main tube for rotational movement and for up and down movement, said auxiliary tube having an inlet means in communication with the lower end thereof and projecting outwardly from said auxiliary tube, a stop element superimposed upon and fixedly carried by said inlet means and engageable with the wall of said container adjacent said filler opening for indicating when said inlet means has been moved upwardly to a predetermined height in said container, and a whistle means carried on the upper end of said auxiliary tube exteriorly of said main tube and operable by the air escaping through the upper end of said auxiliary tube while said container is being filled to the level closing said inlet means.

2. For use with a closed container having a filler opening in the upper end, a liquid level signaling device for insertion into said filler opening, said device comprising a main tube having open upper and lower ends adapted to be loosely inserted into said filler opening with its lower end portion projecting into the container and with its upper end projecting out of said filler opening and adapted to be connected to a source of fluid, means closing said filler opening when said device is inserted in said opening, an auxiliary open-ended tube arranged longitudinally with respect to said main tube and connected to said main tube for rotational movement and for up and down movement, said auxiliary tube having an inlet means in communication with the lower end thereof and projecting outwardly from said auxiliary tube, a stop element superimposed upon and fixedly carried by said inlet means and engageable with the wall of said container adjacent said filler opening for indicating when said inlet means has been moved upwardly to a predetermined height in said container, a whistle means carried on the upper end of said auxiliary tube exteriorly of said main tube and operable by the air escaping through the upper end of said auxiliary tube while said container is being filled to the level closing said inlet means, means operatively connected to said auxiliary tube for effecting the rotational and up and down movements of the latter.

3. For use with a closed container having a filler opening in the upper end, a liquid level signaling device for insertion into said filler opening, said device comprising a main tube having open upper and lower ends adapted to be loosely inserted into said filler opening with its lower end portion projecting into the container and with its upper end projecting out of said filler opening and adapted to be connected to a source of fluid, means closing said filler opening when said device is inserted in said opening, an auxiliary open-ended tube arranged longitudinally with respect to said main tube and connected to said main tube for rotational movement and for slidable up and down movement, said auxiliary tube having an inlet means in communication with the lower end thereof and projecting outwardly from said auxiliary tube, a stop element superimposed upon and fixedly carried by said inlet means and engageable with the wall of said container adjacent said filler opening for indicating when said inlet means has been moved upwardly to a predetermined height in said container, a whistle means carried on the upper end of said auxiliary tube exteriorly of said main tube and operable by the air escaping through the upper end of said auxiliary tube while said container is being filled to the level closing said inlet means, and air volume regulating means operatively connected to said auxiliary tube adjacent said whistle means for controlling the admission of air to said whistle means.

4. For use with a closed container having a filler opening in the upper end, a liquid level signaling device for insertion into said filler opening, said device comprising a main tube having open upper and lower ends adapted to be loosely inserted into said filler opening with its lower end portion projecting into the container and with its upper end projecting out of said filler opening and adapted to be connected to a source of fluid, means closing said filler opening when said device is inserted into said opening, an auxiliary open ended tube arranged longitudinally with respect to said main tube and connected to said main tube for up and down movements, said auxiliary tube having an air inlet means in communication with the lower end thereof and projecting outwardly from said auxiliary tube, a stop element on said auxiliary tube and spaced inwardly from said air inlet means and engageable with the wall of said container adjacent said filler opening for indicating when said inlet means has been moved upwardly to a predetermined height in said container, and a whistle means carried on the upper end of said auxiliary tube exteriorly of said main tube and operable by the air escaping through the upper end of said auxiliary tube while said container is being filled to the level closing said inlet means.

5. For use with a closed container having a filler opening in the upper end, a liquid level signaling device for insertion into said filler opening, said device comprising a main tube having open upper and lower ends adapted to be loosely inserted into said filler opening with its lower end portion projecting into the container and with its upper end projecting out of said filler opening and adapted to be connected to a source of fluid, means closing said filler opening when said device is inserted in said opening, a sleeve arranged longitudinally of said main tube and fixedly secured to said main tube, an auxiliary open ended tube extending through said sleeve and slidably connected to said sleeve for up and down movement, said auxiliary tube having an air inlet means in communication with the lower end thereof and projecting outwardly from said auxiliary tube, a stop element on said auxiliary tube and spaced inwardly from said air inlet means and engageable with the wall of said container adjacent said filler opening for indicating when said inlet means has been moved upwardly to a predetermined height in said container, and a whistle means carried on the upper end of said auxiliary tube exteriorly of said main tube and operable by the air escaping through the upper end of said auxiliary tube while said container is being filled to the level closing said inlet means.

6. For use with a closed container to contain liquid and having means defining a filling opening in the upper end thereof, a filling and liquid level signaling device arranged to be inserted substantially axially within said filling opening to effect filling thereof to a predetermined amount and comprising in combination, an elongated main tube arranged to be connected at one end to a source of liquid and insertable into said tank through said filling opening thereof, positioning means on said main tube interengageable with said means defining a filling opening to hold said device positioned therein and restrict the outward flow of air therefrom, an auxiliary tube supported by said main tube for longitudinal movement relative thereto and the upper end of said auxiliary tube extending above said means defining a filling opening, means extendable laterally to and from the lower portion of said auxiliary tube and engageable with said means defining a filling opening when said tube is moved longitudinally to effect such engagement, said lower portion of said auxiliary tube having air inlet means positioned a predetermined distance within said tank when said laterally extending means is in engagement with said means defining a filling opening, and audible signal means carried by the upper portion of said auxiliary tube and operable by air escaping through said auxiliary tube from said tank during the filling thereof with liquid until the liquid covers said air inlet means.

7. For use with a closed container to contain liquid and having means defining a filling opening in the upper end thereof, a filling and liquid level signaling device arranged to be inserted substantially axially within said filling opening to effect filling thereof to a predetermined amount and comprising in combination, an elongated main tube arranged to be connected at one end to a source of liquid and insertable into said tank through said filling opening thereof, positioning means on said main tube interengageable with said means defining a filling opening to hold said device positioned therein and restrict the outward flow of air therefrom, an auxiliary tube supported by said main tube for rotation and longitudinal movement relative thereto and the upper end of said auxiliary tube extending above said means defining a filling opening, means extendable laterally to and from the lower portion of said auxiliary tube and engageable with said means defining a filling opening when said auxiliary tube is moved longitudinally and rotated to one position relative to said main tube to effect such engagement, said lower portion of said auxiliary tube having air inlet means positioned a predetermined distance within said tank when said laterally extending means is in engagement with said means defining a filling opening, and audible signal means carried by the upper portion of said auxiliary tube and operable by air escaping through said auxiliary tube from said tank during the filling thereof with liquid until the liquid covers said air inlet means.

8. For use with a closed container to contain liquid and having means defining a filling opening in the upper end thereof, a filling and liquid level signaling device arranged to be inserted substantially axially within said filling opening to effect filling thereof to a predetermined amount and comprising in combination, an elongated main tube arranged to be connected at one end to a source thereof, positioning means on said main tube interengageable with said means defining a filling opening to hold said main tube positioned therein and restrict the flow of air therefrom, a longitudinally slotted sleeve fixed relative to said main tube and extending longitudinally thereof, an auxiliary tube supported within said sleeve for longitudinal movement relative thereto and the upper end of said auxiliary tube extending above said sleeve and means defining a filling opening, means extendable laterally to and from the lower portion of said auxiliary tube and slidable within the slot of said sleeve when extended therefrom and engageable with said means defining a filling opening when said auxiliary tube is moved longitudinally to effect such engagement, said lower portion of said auxiliary tube having air inlet means positioned a predetermined distance within said tank when said laterally extending means is in engagement with said means defining a filling opening, and audible signal means carried by the upper portion of said auxiliary tube and operable by air escaping through said auxiliary tube from said tank during the filling thereof with liquid until the liquid covers said air inlet means.

9. For use with a closed container to contain liquid and having means defining a filling opening in the upper end thereof, a filling and liquid level signaling device arranged to be inserted substantially axially within said filling opening to effect filling thereof to a predetermined amount and comprising in combination, a longitudinally slotted elongated main tube arranged to be connected at one end to a source of liquid and insertable into said tank through said filling opening thereof, positioning means on said main tube interengageable with said means defining a filling opening to hold said main tube positioned therein and restrict the flow of air therefrom, a sleeve fixed longitudinally within said main tube adjacent said slot therein and eccentrically to the axis of said main tube and having a longitudinal slot coinciding with the slot of said main tube, an auxiliary tube slidably supported within said sleeve for longitudinal movement relative thereto and the upper end of said auxiliary tube extending above said sleeve and means defining a filling opening, means laterally extendable to and from the lower portion of said auxiliary tube and slidable within the coinciding slots of said sleeve and main tube when extending laterally beyond said main tube to engage said means defining a filling opening when said auxiliary tube is moved longitudinally of said main tube to effect such engagement, said lower portion of said auxiliary tube having air inlet means positioned a predetermined distance vertically within said tank when said laterally extending means is in engagement with said means defining a filling opening, and audible signal means carried by the upper portion of said auxiliary tube and operable by air escaping through said auxiliary tube from said tank during the filling thereof with liquid until the liquid covers said air inlet means.

References Cited in the file of this patent
UNITED STATES PATENTS

| | | |
|---|---|---|
| 2,703,545 | Sumerak | Mar. 8, 1955 |
| 2,746,415 | Campbell | May 22, 1956 |
| 2,831,452 | Haynes | Apr. 22, 1958 |